United States Patent
Singh et al.

[11] Patent Number: 6,133,481
[45] Date of Patent: Oct. 17, 2000

[54] ISOCYANATE COMPOSITIONS FOR LOW DENSITY POLYURETHANE FOAM

[76] Inventors: Sachchida Nand Singh, 7 Rittenhouse Sq., Sicklerville, N.J. 08081; Michael John Cartmell, 9 Normandy Dr., Chadds Ford, Pa. 19317; James Holloway, 502 Concord Bridge Pl., Newark, Del. 19702

[21] Appl. No.: 09/021,502

[22] Filed: Feb. 10, 1998

Related U.S. Application Data

[60] Provisional application No. 60/040,292, Feb. 11, 1997.

[51] Int. Cl.$^7$ .................................................. C07C 49/23
[52] U.S. Cl. .............................. 568/25; 568/26; 568/330; 568/359; 521/159; 521/174; 528/59
[58] Field of Search ...................................... 521/159, 174; 568/25, 26, 330, 359; 528/59

[56] References Cited

U.S. PATENT DOCUMENTS

| | | |
|---|---|---|
| 4,102,833 | 7/1978 | Salisbury . |
| 5,114,989 | 5/1992 | Elwell et al. . |
| 5,175,195 | 12/1992 | Tani et al. . |
| 5,374,667 | 12/1994 | Hinz et al. . |
| 5,534,185 | 7/1996 | Hinz et al. . |
| 5,591,779 | 1/1997 | Bleys et al. ........................... 521/109.1 |
| 5,621,016 | 4/1997 | Murty et al. ............................. 521/159 |

FOREIGN PATENT DOCUMENTS

| | | |
|---|---|---|
| 0022617 | 1/1981 | European Pat. Off. . |
| 0 566 251 | 10/1993 | European Pat. Off. . |

*Primary Examiner*—John M. Cooney, Jr.
*Attorney, Agent, or Firm*—Kevin J. Boland

[57] ABSTRACT

Improved low density polyurethane foams are prepared from an isocyanate-terminated prepolymer having an NCO content of more than about 31 to about 33.5% by weight comprising:

(a) a polyphenylene polymethylene polyisocyanate comprising
  (i) about 30 to about 100% by weight of diphenylmethane diisocyanate and
  (ii) the remainder selected from the group consisting essentially of higher homologues of polyphenylene polymethylene polyisocyanate, isocyanate-containing ester groups, urea groups, biuret groups, aliphatic groups, carbodiimide groups, isocyanurate groups, uretdione groups and urethane groups; and
(b) a polyoxyalkylene polyol having an oxyethylene content of about 30 to about 90%, a molecular weight of about 1000 to about 12000 and a functionality of about 2 to about 8.

12 Claims, No Drawings

ISOCYANATE COMPOSITIONS FOR LOW DENSITY POLYURETHANE FOAM

This application claims benefit of provisional application Ser. No. 60/040,292, filed Feb. 11, 1997.

The present invention is directed to polyisocyanate compositions useful in the preparation of polyurethane foam. More specifically, the present invention is directed to isocyanate-terminated prepolymers useful in preparing low density polyurethane foams which are particularly useful in pour-in-place packaging applications.

Polyurethane foams are made by mixing and reacting two chemical streams using a foam dispense machine. One stream comprises an isocyanate component while the other stream comprises isocyanate-reactive compounds, blowing agents, catalysts, surfactants, processing aids and other additives. A comprehensive overview of the raw materials used, production technologies, properties and end-use of polyurethane foam has been published in "The ICI Polyurethanes Book," edited by George Woods, John Wiley & Sons Publishers (1987) and "Polyurethane Handbook," edited by Gunter Oertel, published by Hanser (1985). Polyurethane foams are used in a wide range of applications, namely, packaging, automotive, furniture, construction, and appliances. In many, if not all, of these applications, there has been an increased emphasis on environmental friendliness of the polyurethane foam.

Two common environmental themes that have emerged throughout the various applications are: lower density for resource conservation and use of non-ozone-depleting blowing agents to protect the earth's ozone layer. This has meant an increased amount of water in many polyurethane foam formulations. This is because water reacts with isocyanates under foam manufacturing conditions to give carbon dioxide. Higher amounts of water in the foam formulations allows for a reduction in the use of other ozone depleting blowing agents used generally results in a decrease in the density of the foam. This increased use of water has led to many changes in isocyanate-reactive compounds, catalysts, surfactants and other additives. These changes have at times decreased their compatibility with the isocyanate stream. An incompatibility or reduced compatibility of the two streams of the polyurethane foam formulation can result in many problems with the quality of the produced foam. Localized or total foam collapse, non-uniform foam (i.e., striations), coarse foam, and large voids are some of the problems associated with lack of compatibility. Such problems will affect the performance of the foam in the end-use.

Pour in place packaging, used to protect fragile or delicate articles during shipment or storage, is one such application where it is desired to manufacture foams at extremely low densities, most often less than 1 pcf, using water as the sole or dominant blowing agent. Such foams provide numerous advantages, including excellent shock resistance and relatively low weight. The use of higher amounts of water in formulations useful in pour-in-place packaging applications has become widespread.

Formulations useful for the preparation of polyurethane foams utilizing water as a blowing agent are well known. U.S. Pat. Nos. 5,534,185 and 5,374,667 are directed to the preparation of fluorochlorohydrocarbon-free low density polyurethane foams. These patents disclose a liquid polyisocyanate mixture containing the reaction product of a mixture of (a) diphenylmethane diisocyanate and polyphenyl-polymethylene-polyisocyanates with (b) at least one polyoxypropylene-polyoxyethylene polyol. This liquid polyisocyanate mixture is reacted with isocyanate-reactive materials to produce a foam. The liquid polyisocyanate component utilized in these patents has an NCO value of about 22 to 30%.

Similarly, U.S. Pat. No. 5,114,989 discloses an isocyanate-terminated prepolymer useful in preparing flexible polyurethane foam prepared by reacting a polyisocyanate containing 4,4'-methylene diphenyldiisocyanate with a polyoxyalkylene polyol. The resultant prepolymer has an NCO content of 5 to 31% by weight. The prepolymer is reacted with water to form a foam.

U.S. Pat. No. 5,175,195 discloses the production of flexible polyurethane foam comprising the reaction of a polyisocyanate, which is a mixture of an isocyanate-terminated prepolymer prepared by the reaction of diphenylmethane diisocyanate and alkylene polyols with a polyphenylmethane-polyisocyanate. The prepolymer is reacted with water and a hydrogen-containing compound to produce a foam. The prepolymer has an NCO content of 26.5%.

Although each of these patents disclose the preparation of foams utilizing water as a blowing agent, they have demonstrated disadvantages in actual use. Attempts to run such systems utilizing very high amounts of water and/or using low pressure foam dispense machines (to provide foams having a relatively low density), have resulted in foams having various deficiencies related to the compatibility of the isocyanate with water. Compatibility-related foam quality issues such as a foam collapse or shrinkage, coarse foam and unusually large voids can adversely impact a foam's use in packaging applications.

Accordingly, it can be seen that there is a need for a polyisocyanate composition useful in producing polyurethane foams having a low density and which are free of ozone-depleting blowing agents.

It can further be seen that there is a need for such a composition which will produce polyurethane foams of excellent quality, which are free of structural defects such as noted above when produced in conventional foam forming equipment.

It is therefore, an object of the present invention to provide a polyisocyanate prepolymer which can be used to obtain high quality, low density foams in the absence of ozone depleting blowing agents.

The present invention is directed to an isocyanate-terminated prepolymer having an NCO content of more than about 31 to about 33.5% by weight comprising:
(a) a polyphenylene polymethylene polyisocyanate comprising
  (i) about 30 to about 100% by weight of diphenylmethane diisocyanate and
  (ii) the remainder selected from the group consisting essentially of higher homologues of polyphenylene polymethylene polyisocyanate, isocyanate-containing ester groups, urea groups, biuret groups, aliphatic groups, carbodiimide groups, isocyanurate groups, uretdione groups and urethane groups; and
(b) a polyoxyalkylene polyol having an oxyethylene content of about 30 to about 90%, a molecular weight of about 1000 to about 12000 and a functionality of about 2 to about 8.

The weight ratio of component (a) to component (b) in the present prepolymers is about 99.9:0.1 to about 95:5, preferably, about 99.9:0.1 to about 97.5:2.5 and more preferably, about 99.85:0.15 to about 99.0:1.0.

The polyphenylene polymethylene polyisocyanate (PMDI) used as component (a) comprises (i) about 30 to about 100% by weight of diphenylmethane diisocyanate (MDI) and (ii) the remainder selected from the group consisting essentially of higher (i.e., higher than di-) homologues of PMDI, isocyanate-containing ester groups, urea groups, biuret groups, aliphatic groups, carbodiimide groups, isocyanurate groups, uretdione groups and urethane groups. Preferably, component (a) comprises about 35 to about 100% and more preferably about 40 to about 100% of MDI. The MDI utilized as component (a)(i) contains the 4,4' isomer as well as the 2,4' and 2,2' isomers. It is preferred that component (a)(i) comprises a weight ratio of 4,4'-MDI to 2,4' and 2,2' MDI (taken together) in the range of from 99:1 to about 50:50 and preferably about 98:2 to about 60:40.

Isocyanate component (a)(ii) may comprise higher (i.e., higher than di-) homologues of PMDI. Such higher homologues of PMDI may include any of the tri, tetra, heptha, hexa, etc., isocyanates. More particularly, the higher homologues include triphenyldimethane triisocyanate (a 3-ring of oligomer of PMDI), tetraphenyltrimethane tetraisocyanate (a 4-ring oligomer of PMDI) and higher functional oligomers. Suitable higher homologues of PMDI are described in "The ICI Polyurethanes Book", edited by George Woods, John Wiley & Sons Publishers (1987).

Component (a)(ii) may further comprise isocyanates modified with various groups including ester groups, urea groups, biuret groups, aliphatic groups, carbodiimide groups, isocyanurate groups, uretdione groups and urethane groups. Such modified isocyanates and methods for their preparation are known in the art.

When forming the isocyanate-terminated prepolymer of the present invention, PMDI component (a) is reacted with component (b), a polyoxyalkylene polyol. The polyoxyalkylene polyols useful in the present invention have an oxyethylene content of from about 30 to about 90%, preferably between 50 to about 85% and more preferably between about 65 to about 80% by weight. The polyoxyalkylene polyols useful in the present invention further have a functionality of about 2 to about 8 and preferably about 2 to about 6 and more preferably about 2 to 4 and a molecular weight of about 1000 to about 12,000, preferably about 1200 to about 10,000 and more preferably about 1400 to about 8000.

Polyoxyalkylene polyols suitable for use in the present invention include those obtained by reacting alkylene oxides with initiators containing from 2 to 8 active hydrogen groups per molecule. Suitable alkylene oxides include, e.g., butylene oxide, propylene oxide and ethylene oxide. Suitable initiators include polyols (e.g., water, ethylene glycol, diethylene glycol, propylene glycol, butanediol, glycerol, trimethylolpropane, triethanolamine, pentaerythritol, sorbitol and sucrose); polyamines (e.g., ethylene diamine, tolylene diamine, diamino diphenylmethane and polymethylene polyphenylene polyamines; amino alcohols (e.g., ethanolamine and diethanolamine); and mixtures thereof. Preferred alkylene oxides are propylene oxide and ethylene oxide. Preferred initiators include these containing from about 2 to about 6 hydrogen groups per molecule. Examples of such preferred initiators include ethylene glycol, diethylene glycol, propylene glycol, glycerol, trimethylolpropane, triethanolamine, pentaerythritol and sorbitol.

The prepolymers of the present invention can be prepared by any suitable method known to those skilled in the art. However, it is preferred that the present prepolymers are prepared either by reacting isocyanate component (a) directly with polyol component (b) or by first reacting a portion of isocyanate component (a) with polyol component (b) to form a semi-prepolymer and then diluting this semi-prepolymer with the remainder of polyisocyanate component (a).

As noted above, the NCO content of the resultant isocyanate-terminated prepolymers is more than about 31 to about 33.5%. Preferably, the NCO content of the prepolymer is more than about 31 to about 33% and more preferably about 31.5 to about 32.5%. The unusually high NCO content of the present prepolymers is achieved since only a relatively small amount of polyol component (b) is used in the prepolymer compared to the amount of isocyanate component (a). It is believed that this high NCO content contributes significantly to the excellent qualities of the foams produced with the prepolymers of the present invention.

The isocyanate-terminated prepolymers of the present invention are reacted with isocyanate-reactive components (i.e., the resin side) to produce low density polyurethane foams. It will be evident to those skilled in the art that conventional resin side materials can be used as needed for a particular purpose and the present invention is not limited to a particular resin side material. However, it is preferred that the resin side comprise one or more of the following components:

1. Polyfunctional isocyanate-reactive compositions with which the present isocyanate-terminated prepolymers can be reacted to form polyurethane or isocyanate-modified polyurethane foams. Examples of such compositions include polyether polyols, polyester polyols and mixtures thereof, having average hydroxyl numbers of from about 100 to about 1000 of preferably about 150 to about 700 KOH/g and average hydroxyl functionalities of about 2 to about 8 and preferably about 2 to about 6. Further examples of suitable polyfunctional isocyanate-reactive compositions include active hydrogen-terminated polythioethers, polyamides, polyester amides, polycarbonates, polyacetals, polyolefins and polysiloxanes. Additional useful isocyanate-reactive materials include polymer polyols, which are dispersion or solutions of addition or condensation polymers in polyols of the type described above.

2. Water or other carbon dioxide evolving compounds such as mono- or polycarboxylic acid, isocyanate-reactive cyclic carbonate, and isocyanate-reactive cyclic urea.

3. Liquid or dissolved carbon dioxide such as described in U.S. Pat. No. 5,578,655.

4. Physical blowing agents other than a chlorofluorocarbon or hydrochlorofluorocarbon. Suitable physical blowing agents include aliphatic and cycloaliphatic hydrofluorocarbons, dialkyl ethers, fluorine-containing ethers, alkyl alkanoates, and hydrocarbons. Preferred physical blowing agents include 1,1,1,2-tetrafluoroethane (HFG-134a), 1,1,1,3,3-penta-fluoropropane (HFC-245fa) and mixtures thereof.

The resin side can also contain various auxiliary agents and additives as needed for a particular purpose. Suitable auxiliaries and additives include crosslinking agents, such as triethanolamine and glycerol; foam stabilizing agents or surfactants, such as siloxane-oxyalkylene copolymers; catalysts, such as tertiary amines, (e.g., (bis-2-dimethyl aminoethyl) ether, N,N-dimethylethanolarnine, dimethyl aminoethoxyethanol, pentamethyldiethylenetriamine), organometallic compounds (e.g., dibutyl tin dilaurate and potassium octoate), quaternary ammonium salts (e.g., 2-hydroxypropyl trimethylammonium formate) and n-substituted triazines; reactive and non-reactive fire retardants, such as trischloropropylphosphate and hydroxyl-containing oligomeric phosphates; viscosity reducers such as propylene carbonate; mold release agents, such as zinc stearate; fillers, such as carbon black; and antioxidents, such as butylated hydroxy toluene.

The low density polyurethane foams produced with the present isocyanate-terminated prepolymers may be prepared by reacting the isocyanate-terminated prepolymer with the resin side described above in ratios and at conditions suitable for forming polyurethane foam. Such ratios and reaction conditions are well known to those skilled in the art. However, it is preferred that the prepolymer and resin components be reacted at ratios of about 1:10 to about 10:1 and preferably about 1:5 to about 5:1. Preferably, conventional foam dispensing machines can be utilized in the reaction of these components to form low density polyurethane foams. An example of a suitable foam forming machine is an Instapack® 808 low pressure foam dispense machine available from Sealed Air Corporation.

Foams produced in accordance with the present invention contain significantly less defects in comparison to conventional packaging foams. Moreover, foams prepared in accordance with the present invention have a density of less than about 2 pcf, more preferably less than about 1 pcf and even more preferably less than about 0.3 pcf.

The present invention will now be illustrated by the following non limiting examples.

EXAMPLE 1

A prepolymer according to the present invention was prepared by reacting 82.1 pbw of an isomeric mixture of diphenylmethane diisocyanate containing 70% 4,4'-isomer with 17.9 pbw of an oxyethylated oxypropylated trimethylolpropane-initiated polyol having an oxyethylene content of about 75% randomly distributed and a molecular weight of 4000. The reaction was carried out at 80–90° C. for 2.5 hours and the prepolymer obtained had a free-NCO content of 27% by weight. 0.7 pbw of the above prepolymer was blended with 99.3 pbw of a PMDI composition having a diphenylmethane diisocyanate content of 52% [weight ratio of 4,4' isomer to (2,4'+2,2') isomer was 85:15] and a free-NCO content of 31.9%. The free-NCO content of the resulting prepolymer was 31.8%.

Low density packaging foam was made using an Instapack® 808 foam dispense machine with the isocyanate prepolymer described above as component (a) and UltraLite™ polyfunctional isocyanate-reactive composition available from Sealed Air Corporation as component (b). The Instapack® 808 is a low pressure (<500 psi) foam dispense machine also available from Sealed Air Corporation.

Low density polyurethane foam was prepared by reacting the polyisocyanate prepolymer with the polyfunctional isocyanate-reactive composition at a weight ratio of 63:37 (isocyanate:isocyanate-reactive composition). The prepolymer was heated to 160° F. and the isocyanate-reactive composition was heated to 170° F. prior to the reaction and these temperatures were maintained during the entire reaction.

The density of the obtained foam was measured according to the procedures set forth in ASTM D1622. The foam density was 0.25 pcf. The foam did not have any region of foam collapse, non-uniform foam (i.e., striations), coarse foam, or large voids. The foam was suitable to protect fragile or delicate articles during shipment or storage.

EXAMPLE 2

A prepolymer according to the present invention was prepared by reacting 82.1 pbw of an isomeric mixture of diphenylmethane diisocyanate containing 70% 4,4'-isomer with 17.9 pbw of an oxyethylated oxypropylated trimethylolpropane-initiated polyol having an oxyethylene content of about 75% randomly distributed and a molecular weight of 4000. The reaction was carried out at 80–90° C. for 2.5 hours and the prepolymer obtained had a free-NCO content of 27% by weight. 1.7 pbw of the above prepolymer was blended with 98.3 pbw of a PMDI composition having diphenylmethane diisocyanate content of 52% [weight ratio of 4,4' isomer to (2,4'+2,2') isomer was 85:15] and a free-NCO content of 31.9%. The free-NCO content of the resulting isocyanate prepolymer was 31.65%.

Low density polyurethane foam was made in the manner set forth in Example 1. The density of the foam, measured according to ASTM D1622, was 0.25 pcf. The foam did not have any region of foam collapse, non-uniform foam (i.e., striations), coarse foam, or big voids. The foam was suitable to protect fragile or delicate articles during shipment or storage.

EXAMPLE 3

Polyurethane foam was prepared by reacting a PMDI composition comprising 52% of diphenylmethane diisocyanate [the weight ratio of 4,4' isomer to (2,4'+2,2') isomer was 85:15] and a free-NCO content of 31.9% with the isocyanate-reactive component described in Example 1. The reaction conditions and component ratios were the same as those set forth in Example 1.

The density of the foam was 0.254 pcf. It contained a region of collapsed foam near the center of the bun. It also showed some non-uniform foam (i.e., striations) in the initial pour region. The foam was of poor quality and was deemed unsuitable to protect fragile or delicate articles during shipment or storage.

EXAMPLE 4

A prepolymer was prepared by reacting 82.1 pbw of an isomeric mixture of diphenylmethane diisocyanate containing 70% 4,4'-isomer with 17.9 pbw of an oxyethylated oxypropylated trimethylolpropane-initiated polyol having an oxyethylene content of about 75% randomly distributed and a molecular weight of 4000. The reaction was carried out at 80–90° C. for 2.5 hours and the prepolymer had an free-NCO content of 27% by weight. 29 pbw of the above prepolymer were blended with 71 pbw of a PMDI of diphenylmethane diisocyanate content of 52% [the weight ratio of 4,4' isomer to (2,4'+2,2') isomer was 85:15] and free-NCO of 31.9%. The free-NCO content of resulting isocyanate prepolymer was 30.45%.

Polyurethane foam was prepared in the manner set forth in Example 1. The density of the foam, measured according to ASTM D1622, was 0.26 pcf and it did not have any region of foam collapse, non-uniform foam (i.e., striations), coarse foam, or big voids. The foam started to shrink within hours of foaming. Due to the shrinkage, this foam was deemed unsuitable to protect fragile or delicate articles during shipment or storage.

EXAMPLE 5

A prepolymer was prepared by reacting 82.1 pbw of an isomeric mixture of diphenylmethane diisocyanate containing 70% 4,4'-isomer with 17.9 pbw of an oxyethylated oxypropylated trimethylolpropane-initiated polyol having an oxyethylene content of about 75% randomly distributed and a molecular weight of 4000. The reaction was carried out at 80–90° C. for 2.5 hours and the prepolymer obtained had an free-NCO content of 27% by weight. 69 pbw of the above prepolymer were blended with 31 pbw of a PMDI having a diphenylmethane diisocyanate content of 36% [the weight ratio of 4,4' isomer to (2,4'+2,2') isomer was 96:4] and a free-NCO content of 31.1%. The free-NCO content of the resulting isocyanate prepolymer was 28.2%.

Polyurethane foam was prepared in the manner set forth in Example 1. The foam collapsed into a pancake moments after making. Due to collapse, this foam was deemed unsuitable to protect fragile or delicate articles during shipment or storage.

EXAMPLE 6

A prepolymer was prepared by reacting 92.5 pbw of a polymeric MDI having diphenylmethane diisocyanate content of 60% with 7.5 pbw of an oxyethylated oxypropylated glycerine-initiated polyol having an oxyethylene content of about 5% and a molecular weight of 3100. The reaction was carried out at 80–90° C. for 2.5 hours and the prepolymer had an free-NCO content of 29.4% by weight. 75 pbw of the above prepolymer were blended with 25 pbw of an isomeric mixture of diphenylmethane diisocyanate containing 80% 4,4'-isomer and a free-NCO content of 33.5%. The free-NCO content of resulting isocyanate prepolymer was 30.4%.

Polyurethane foam was prepared in the manner set forth in Example 1. The foam collapsed into a pancake moments after making. Due to collapse, this foam was deemed unsuitable to protect fragile or delicate articles during shipment or storage.

EXAMPLE 7

A prepolymer was prepared by reacting 97 pbw of an isomeric mixture of diphenylmethane diisocyanate containing 80% 4,4'-isomer with 3 pbw of an diol mix containing 1,2 propylene glycol, 1,3 butylene glycol and diethylene glycol in a molar ratio of 1:1:0.9. The number average molecular weight of the glycol mix is 90. The reaction was carried out at 80–90° C. for 2.5 hours and the prepolymer obtained had an free-NCO content of 29.7% by weight. 24.4 pbw of the above prepolymer were blended with 75.6 pbw of a PMDI of diphenylmethane diisocyanate content of 44% [the weight ratio of 4,4' isomer to (2,4'+2,2') isomer was 95:5] and free-NCO of 31.5%. The free-NCO content of resulting isocyanate prepolymer was 30.85%.

Polyurethane foam was prepared in the manner set forth in Example 1. The density of the foam, measured according to ASTM D1622, made 0.26 and it contained a region of collapsed foam near the center of the bun. The foam was coarser than those in Example 1. Overall the foam quality was not good and was deemed unsuitable to protect fragile or delicate articles during shipment or storage.

Accordingly, it can be seen that polyurethane foams produced in accordance with the present invention have a relatively low density and are of good quality, demonstrating no compatibility problems.

What is claimed is:

1. An isocyanate-terminated prepolymer having an NCO content of more than 31 to about 33.5% by weight comprising:
   (a) a polyphenylene polymethylene polyisocyanate comprising
      (i) about 30 to about 100% by weight of diphenylmethane diisocyanate and
      (ii) the remainder selected from the group consisting of higher homologues of polyphenylene polymethylene polyisocyanate, isocyanate-containing ester groups, urea groups, biuret groups, aliphatic groups, carbodiimide groups, isocyanurate groups, uretdione groups and urethane groups; and
   (b) a polyoxyalkylene polyol having an oxyethylene content of about 30 to about 90%, a molecular weight of about 1000 to about 12000 and a functionality of about 2 to about 8, wherein the weight ratio of component (a) to component (b) is from about 99.9:0.1 to about 97.5:2.5.

2. An isocyanate-terminated prepolymer as claimed in claim 1 wherein the weight ratio of component (a) to component (b) is from about 99.9:0.1 to about 97.5:2.5.

3. An isocyanate-terminated prepolymer as claimed in claim 1 wherein the weight ratio of component (a) to component (b) is from about 99.85:0.15 to about 99.0:1.0.

4. An isocyanate-terminated prepolymer as claimed in claim 1 wherein component (a) comprises from about 35 to about 100% diphenylmethane diisocyanate.

5. An isocyanate-terminated prepolymer as claimed in claim 4 wherein component (a) comprises from about 40 to about 100% diphenylmethane diisocyanate.

6. An isocyanate-terminated prepolymer as claimed in claim 1 wherein component (b) has an oxyethylene content of from about 30 to about 90% by weight.

7. An isocyanate-terminated prepolymer as claimed in claim 1 wherein component (b) has a functionality of from about 2 to about 6.

8. An isocyanate-terminated prepolymer as claimed in claim 1 wherein component (b) has a molecular weight of from about 1200 to about 10000.

9. A method of preparing an isocyanate-terminated prepolymer as claimed in claim 1 which method comprises reacting isocyanate component (a) directly with polyol component (b).

10. A method of preparing an isocyanate-terminated prepolymer as claimed in claim 1 which method comprises first reacting a portion of isocyanate component (a) with polyol component (b) to form a semi-prepolymer and then diluting the semi-prepolymer with the remainder of polyisocyanate component (a).

11. A polyurethane foam comprising the reaction product of an isocyanate-terminated prepolymer as claimed in claim 1 and an isocyanate reactive component.

12. A polyurethane foam as claimed in claim 11 having a density of less than about 2 pcf.

* * * * *